United States Patent
Harada

(10) Patent No.: US 11,885,956 B2
(45) Date of Patent: Jan. 30, 2024

(54) IONIZATION DEVICE

(71) Applicant: SHIMADZU CORPORATION, Kyoto (JP)

(72) Inventor: Takahiro Harada, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 34 days.

(21) Appl. No.: 17/625,542

(22) PCT Filed: Jul. 29, 2019

(86) PCT No.: PCT/JP2019/029713
§ 371 (c)(1),
(2) Date: Jan. 7, 2022

(87) PCT Pub. No.: WO2021/019659
PCT Pub. Date: Feb. 4, 2021

(65) Prior Publication Data
US 2022/0277947 A1 Sep. 1, 2022

(51) Int. Cl.
*H01J 49/16* (2006.01)
*G02B 26/02* (2006.01)

(52) U.S. Cl.
CPC ............ *G02B 26/02* (2013.01); *H01J 49/164* (2013.01)

(58) Field of Classification Search
CPC .................................. G02B 26/02; H01J 49/164
See application file for complete search history.

(56) References Cited

U.S. PATENT DOCUMENTS

| 5,461,235 A | * | 10/1995 | Cottrell | H01J 49/164 |
| | | | | 250/423 P |
| 2021/0257203 A1 | * | 8/2021 | Shichi | H01J 49/164 |
| 2022/0326181 A1 | * | 10/2022 | Mishima | H01J 49/161 |

FOREIGN PATENT DOCUMENTS

| JP | 10-153579 A | 6/1998 |
| JP | 2007-257851 A | 10/2007 |

OTHER PUBLICATIONS

Decision to Grant a Patent dated Aug. 23, 2022 from the Japanese Patent Office in Japanese Application No. 2021-536496.
Written Opinion for PCT/JP2019/029713, dated Oct. 15, 2019.
International Search Report for PCT/JP2019/029713, dated Oct. 15, 2019.

* cited by examiner

*Primary Examiner* — Michael J Logie
(74) *Attorney, Agent, or Firm* — Sughrue Mion, PLLC

(57) ABSTRACT

An ionization device including: a laser light source; a light collection optical system configured to irradiate a sample with the laser light; a first intensity changing unit configured to continuously change an intensity of laser light; a second intensity changing unit configured to stepwisely change an intensity of laser light; an irradiation diameter setting reception unit configured to receive setting of an irradiation diameter of laser light; an irradiation intensity setting reception unit configured to receive setting of an irradiation intensity of laser light; and a laser light intensity controller configured to set an intensity of the laser light by changing an irradiation diameter of the laser light by the light collection optical system and controlling the second intensity changing unit according to the irradiation diameter, and by controlling the first intensity changing unit according to the irradiation intensity.

5 Claims, 3 Drawing Sheets

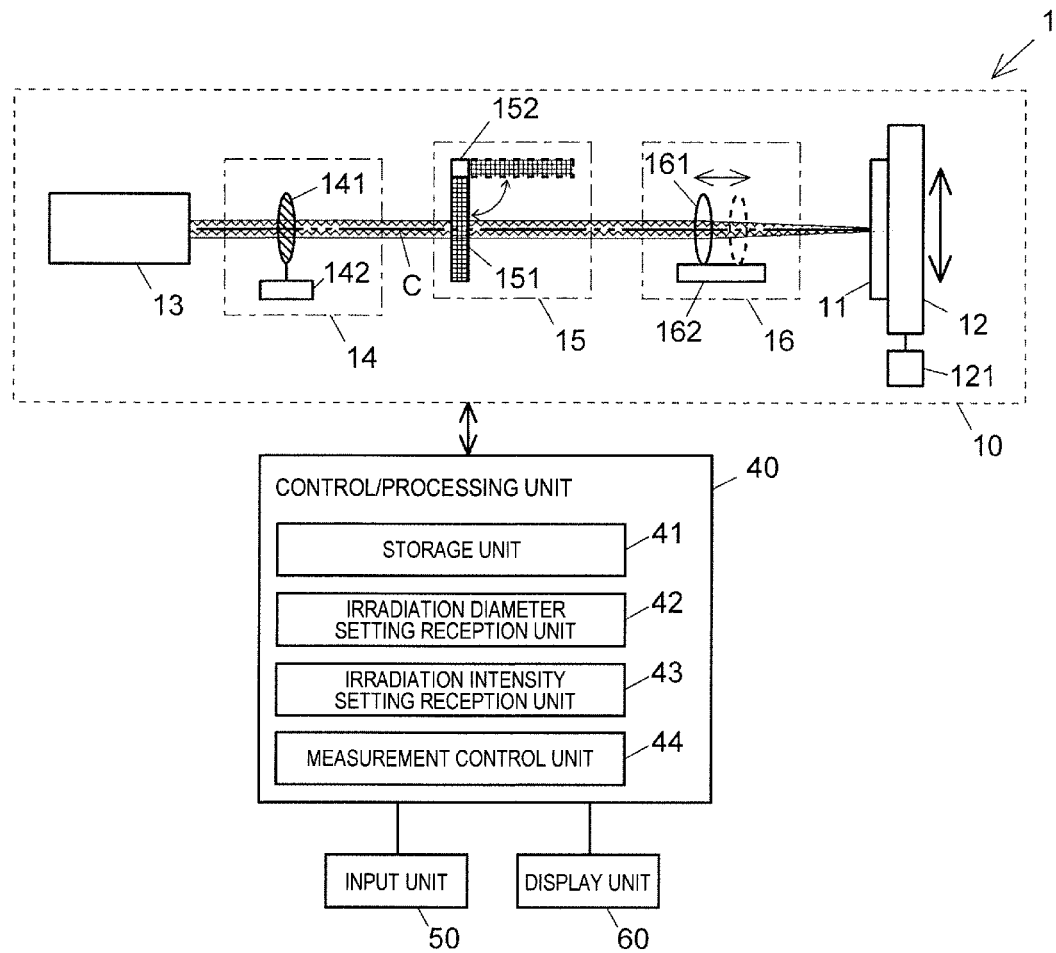

IONIZATION DEVICE

CROSS REFERENCE TO RELATED APPLICATIONS

This application is a National Stage of International Application No. PCT/JP2019/029713 filed Jul. 29, 2019.

TECHNICAL FIELD

The present invention relates to an ionization device used in a mass spectrometer or the like.

BACKGROUND ART

Methods for ionizing a sample used in a mass spectrometer include a laser desorption/ionization (LDI) method. The laser desorption/ionization method is a method of irradiating the surface of a sample with laser light to excite and ionize sample molecules by the energy of the laser light. An ionization device configured to ionize sample molecules by the LDI method is called an LDI device (e.g., Patent Literature 1).

The laser desorption/ionization methods include a matrix assisted laser desorption/ionization (MALDI) method. In the matrix assisted laser desorption/ionization method, a substance (matrix substance) that easily absorbs laser light and easily ionizes is mixed with a sample. Then, the sample molecules are incorporated into the matrix substance to be microcrystallized, and then the microcrystals of the matrix substance incorporating the sample molecules are irradiated with laser light to ionize the sample molecules. An ionization device configured to ionize sample molecules by the MALDI method is called a MALDI device.

The LDI device and the MALDI device can perform imaging measurement, which is to generate and measure ions from sample molecules at each of a plurality of measurement points that are two-dimensionally distributed on the sample surface. For example, by performing mass spectrometry of ions generated at each measurement point of a sample surface, it is possible to acquire data indicating the distribution of a specific substance on the sample surface.

In many LDI devices and MALDI devices, a plurality of candidate values of the irradiation diameter of the laser light with which the sample surface is irradiated are prepared, and the user can select one according to the purpose of analysis. For example, a large irradiation diameter is selected if measurement throughput or sensitivity is prioritized over spatial resolution, and a small irradiation diameter is selected if measurement is performed on an analysis target region with high spatial resolution. By performing trial measurement while continuously changing the fluence (energy density per unit area) of laser light, it is possible to determine the fluence optimal for ionization of target sample molecules. Therefore, the LDI device and the MALDI device include a light collection optical system (e.g., light collection lens) for changing the irradiation diameter of laser light, and an attenuator (e.g., density wheel) capable of continuously changing the intensity of the laser light emitted from the laser light source for adjusting the fluence of the laser light for each irradiation diameter of the laser light.

CITATION LIST

Patent Literature

Patent Literature 1: JP 2007-257851 A

SUMMARY OF INVENTION

Technical Problem

In conventional LDI devices and MALDI devices, it has been common to select one irradiation diameter of laser light. However, in recent years, there is a growing need to perform measurement using a plurality of irradiation diameters.

In a case of selecting the irradiation diameter of the laser light in the range of $\phi 2$ μm to $\phi 200$ μm, for example, the difference in the irradiation area of the laser light is up to 10,000 times. That is, in order to irradiate the sample surface with both the laser light of $\phi 2$ μm and the laser light of $\phi 200$ μm at the fluence of the same level, it is necessary to change the intensity of the laser light emitted from the laser light source in a range of four digits. In consideration of the optimizing process of the irradiation intensity of laser light, a wider range is required. However, since a settable range of a general attenuator is three digits or less, conventional LDI devices and MALDI devices cannot meet the above needs. Providing a plurality of attenuators can expand the setting range, but providing a plurality of attenuators makes the device expensive.

A problem to be solved by the present invention is for an ionization device configured to generate ions by irradiating a sample with laser light to adjust the intensity of laser light irradiated to a sample in a range exceeding a setting range of an attenuator while suppressing cost, to enable setting of an irradiation diameter of the laser light in a wider range than before, and to improve convenience of the work.

Solution to Problem

The present invention made to solve the above problems is an ionization device configured to generate ions by irradiating a sample with laser light, the ionization device including:
  a light source configured to emit laser light;
  a light collection optical system configured to collect laser light emitted from the light source and irradiate a sample with the laser light;
  a first intensity changing unit configured to continuously change an intensity of laser light with which the sample is irradiated;
  a second intensity changing unit configured to stepwisely change an intensity of laser light with which the sample is irradiated;
  an irradiation diameter setting reception unit configured to receive setting of an irradiation diameter of laser light to the sample;
  an irradiation intensity setting reception unit configured to receive setting of an irradiation intensity of laser light to the sample; and
  a laser light intensity controller configured to set an intensity of the laser light with which the sample is irradiated by changing an irradiation diameter of the laser light by means of the light collection optical system and controlling the second intensity changing unit according to the irradiation diameter received by the irradiation diameter setting reception unit, and by controlling the first intensity changing unit according to the irradiation intensity received by the irradiation intensity setting reception unit.

Generating ions by irradiating a sample with the laser light is not limited to generating ions directly from the sample by irradiation with laser light, and includes desorbing molecules from the sample by irradiation with laser light and ionizing the desorbed molecules by another method (contact with a discharge probe, charge exchange with reaction ions, or the like).

The first intensity changing unit is, for example, a density wheel. The second intensity changing unit is, for example, a darkening filter and a switching unit configured to switch use/non-use of the darkening filter. The first intensity changing unit and the second intensity changing unit may be disposed on an optical path between the light source and the light collection optical system, or may be disposed on an optical path between the light collection optical system and the sample.

It is possible to perform setting of the irradiation intensity through the irradiation intensity setting reception unit by various methods such as inputting a numerical value on predetermined software or operating the first intensity changing unit itself (e.g., rotating the density wheel).

Advantageous Effects of Invention

The ionization device according to the present invention includes the light collection optical system configured to collect laser light, the first intensity changing unit configured to continuously change the intensity of laser light, and the second intensity changing unit configured to stepwisely change the intensity of laser light. Combining these, it is possible to change the intensity of laser light in a range wider than the range of the intensity of the laser light changeable by the first intensity changing unit. However, since the second intensity changing unit stepwisely changes the intensity of laser light, when the second intensity changing unit is operated during adjustment of the irradiation intensity of laser light for a certain irradiation diameter, the irradiation intensity of the laser light discontinuously changes. Therefore, in the ionization device according to the present invention, the second intensity changing unit changes the intensity of the laser light with which the sample is irradiated according to the irradiation diameter set in the irradiation diameter setting reception unit, and changes the intensity of the laser light with which the sample is irradiated according to the irradiation intensity set in the irradiation intensity setting reception unit. This can continuously change the intensity of laser light in a range exceeding the setting range of the first intensity changing unit. The second intensity changing unit only needs to stepwisely change the intensity of laser light, and only needs to use a darkening filter or the like having a simple configuration. Therefore, it is possible to configure the second intensity changing unit at a lower cost than the configuration including a plurality of attenuators configured to continuously change the intensity of laser light. Since the intensity of the laser light with which the second intensity changing unit irradiates the sample is automatically changed according to the irradiation diameter set in the irradiation diameter setting reception unit, convenience of the work is improved.

BRIEF DESCRIPTION OF DRAWINGS

FIG. 1 is a main portion configuration view of an embodiment of an ionization device according to the present invention.

FIG. 2 is a view illustrating a relationship among a candidate value of an irradiation diameter, a position of a light collection lens, use/non-use of a darkening filter, and a settable range of a laser light irradiation intensity in the ionization device of the present embodiment.

DESCRIPTION OF EMBODIMENTS

Figure 3:
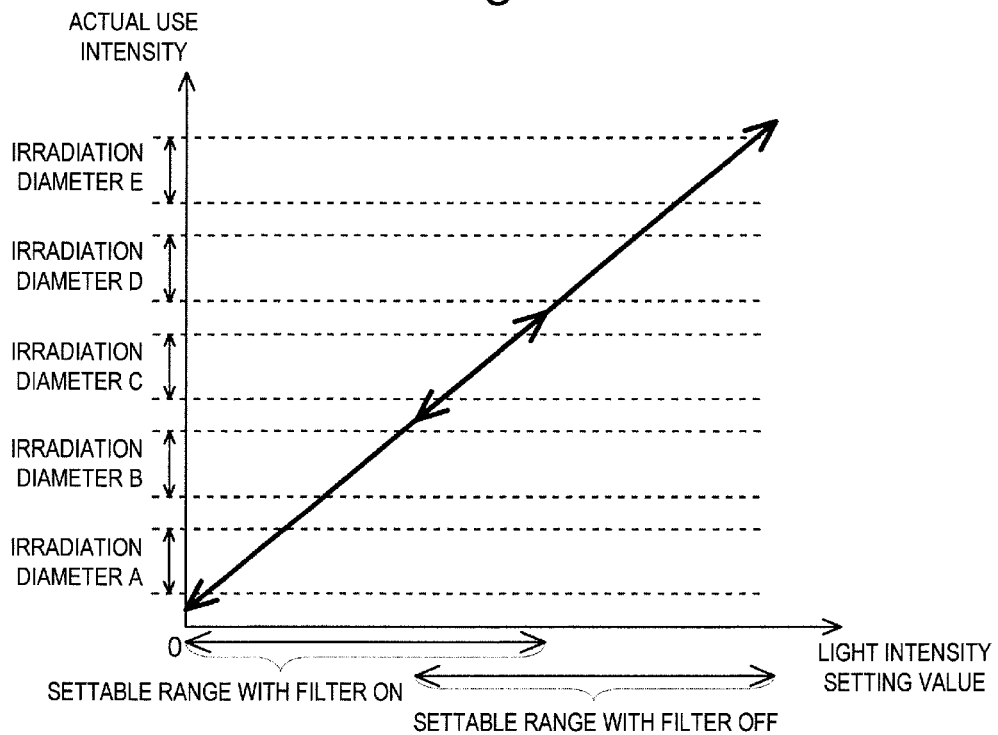
FIG. 3 is a view illustrating the settable range of the irradiation intensity of laser light at the time of use/non-use of the darkening filter and an irradiation intensity range of the laser light actually used in a candidate value of each irradiation diameter in the ionization device of the present embodiment.

An embodiment of an ionization device according to the present invention will be described below with reference to the drawings.

An ionization device 1 of the present embodiment is a device (MALDI device) configured to generate ions by irradiating a sample 11 mixed with a matrix substance in advance with laser light, and is used as an ionization unit of an imaging mass spectrometer, for example. It is also possible to use the ionization device according to the present invention as an ionization unit of an ion analysis device such as an ion mobility analysis device, in addition to a mass spectrometer. The ionization device can also be a device (LDI device) configured to generate ions by irradiating an untreated sample (not mixed with a matrix substance) with laser light. Alternatively, the ionization device can also be an ionization device configured to desorb sample molecules by irradiating the sample with laser light, and ionize the desorbed sample molecules by another method (contact with a discharge probe, charge exchange with reaction ions, or the like).

FIG. 1 is a main portion configuration view of the ionization device 1 according to the present embodiment. The ionization device 1 roughly includes a body portion 10 and a control/processing unit 40. The body portion 10 includes a sample stage 12 on which the sample 11 is placed, a laser light source 13, a first intensity changing unit 14, a second intensity changing unit 15, and a light collection unit 16.

The sample stage 12 is configured to be movable in a plane parallel to the sample placement surface of the sample stage 12 by a drive mechanism 121. By moving the sample stage 12 by the drive mechanism 121, it is possible to change the irradiation position of laser light onto the sample 11 placed on the sample stage 12.

The first intensity changing unit 14 includes a density wheel 141 that is a disk-shaped member in which a region where the transmittance continuously changes is formed in the circumferential direction, and a rotation mechanism 142 configured to rotate the density wheel 141. In the first intensity changing unit 14, the rotation mechanism 142 rotates the density wheel 141 to change the transmittance of the region positioned on the optical path, and thus the intensity of laser light is continuously changed.

The second intensity changing unit 15 includes a darkening filter 151 having a predetermined transmittance for the wavelength of the laser light emitted from the laser light source 13, and a switching unit 152 configured to perform switching between a state (solid line) in which the darkening filter 151 is disposed on the optical path of the laser light and a state (broken line) in which the darkening filter 151 is disposed off the optical path.

The light collection unit 16 includes a light collection lens 161 and a drive mechanism 162 configured to move the light collection lens 161 along an optical axis C of laser light. By moving the light collection lens 161 along the optical axis C of the laser light by the drive mechanism 162, it is possible to change the diameter (irradiation diameter) of the laser light with which the surface of the sample 11 is irradiated.

The ionization device 1 of the present embodiment uses in combination the density wheel 141 configured to continuously change the intensity of laser light and the darkening filter 151 having a predetermined transmittance (e.g., 10% or less) configured to change the intensity of laser light in two steps by switching between use/non-use. Due to this, the intensity of laser light is changed in a range (e.g., 10,000 times or more, 4 digits or more) wider than the changeable range (e.g., 1,000 times, 3 digits) of laser light by the single density wheel 141. The ionization device 1 of this example can adjust the intensity of laser light at an irradiation diameter (10,000 times and 4 digits in irradiation area ratio) in a range of φ2 μm to φ200 μm, for example.

The control/processing unit 40 controls the operation of each unit in the body portion 10 and processes an input instruction by the user through an input unit 50. The control/processing unit 40 includes an irradiation diameter setting reception unit 42, an irradiation intensity setting reception unit 43, and a measurement control unit 44 as functional blocks in addition to a storage unit 41. The entity of the control/processing unit 40 is a general computer to which the input unit 50 described above and a display unit 60 are connected, and embodies the functional blocks described above by a processor executing a program installed in advance.

The information stored in the storage unit 41 will be described with reference to FIGS. 2 and 3. The storage unit 41 stores a plurality of candidate values A to E (A is a minimum value, and E is a maximum value) regarding the irradiation diameter of laser light onto the surface of the sample 11. The storage unit 41 stores information on positions Pa to Pe of the light collection lens 161 corresponding to the plurality of candidate values A to E, respectively, and information on whether or not (ON/OFF) to use the darkening filter 151 in each of the candidate values A to E. The storage unit 41 stores information regarding the relationship between the irradiation intensity (setting value of the irradiation intensity) of the laser light onto the sample 11 and the rotation angle of the density wheel 141 at the time of each of using and not using the darkening filter 151. These pieces of information are stored in the storage unit 41 at the time of product shipment, for example. By acquiring the information by preliminary measurement, simulation, and the like and additionally storing them in the storage unit 41, it is possible to appropriately add or change a candidate value of the irradiation diameter.

As shown in FIG. 2, in a case where any of the candidate values A to C of the irradiation diameter is selected, the ionization device 1 of the present embodiment uses the darkening filter 151 and changes the intensity of the laser light with which the sample 11 is irradiated by the density wheel 141. In a case where the irradiation diameter D or E is selected, the ionization device 1 does not use the darkening filter 151 and changes the intensity of the laser light with which the sample 11 is irradiated only by the density wheel 141.

In the information shown in FIG. 2, the settable range of the irradiation light intensity is equalized among the irradiation diameters A, B, and C, for example, meanwhile in the MALDI device, when a matrix substance in which the sample is mixed is irradiated with extremely strong laser light, excessive energy is applied to the matrix substance and the sample, and the sample may be damaged. Therefore, for example, in a case where an inexperienced user adjusts the irradiation intensity of laser light, it is preferable to set in advance, for each irradiation diameter, an intensity range (irradiation intensity range of laser light having been narrowed) suitable for irradiating the matrix substance incorporating the sample in the settable range of the irradiation light intensity shown in FIG. 2. FIG. 3 schematically shows the relationship between the candidate values A to E of the irradiation diameter and the intensity range of actually used laser light in a case where such intensity range is set. Setting the intensity range for each irradiation diameter in this manner is not an essential element of the present invention. If there is a possibility of irradiating high-intensity light having a small irradiation diameter as in an LDI device for example, it is not necessary to narrow such intensity range. As FIG. 3 indicates, it is possible to change the candidate value C of the irradiation diameter within the range where the irradiation intensity of the laser light is narrowed down by only the density wheel 141 without using the darkening filter 151.

Next, a procedure for adjusting the irradiation diameter and irradiation intensity of the laser light onto the sample 11 (matrix substance in which the sample is mixed) using the ionization device 1 of the present embodiment will be described.

The user first sets the sample 11 on the sample stage 12. After that, when the user gives an instruction to start measurement by an operation through the input unit 50, the irradiation diameter setting reception unit 42 reads candidate values (irradiation diameters A to E) of the irradiation diameter of the laser light stored in the storage unit 41 and displays the candidate values on a screen of the display unit 60.

When the user selects one of the candidate values, the measurement control unit 44 determines whether or not to use the darkening filter 151 based on the information described with reference to FIG. 2. That is, the measurement control unit 44 determines to use the darkening filter 151 if the user selects any of the irradiation diameters A to C, and determines not to use the darkening filter 151 if the user selects the irradiation diameter D or E. For example, a candidate value of a large irradiation diameter (e.g., the irradiation diameter D or E) is selected if measurement throughput or sensitivity is prioritized over spatial resolution, and a candidate value of a small irradiation diameter (e.g., the irradiation diameter A or B) is selected if measurement is performed on an analysis target region with high spatial resolution. Hereinafter, as a specific example, a case where the user selects the irradiation diameter B will be described.

Next, the irradiation intensity setting reception unit 43 reads the settable range (1 to 1000) of the irradiation light intensity corresponding to the candidate value B of the irradiation diameter having been set, displays the read settable range on the screen of the display unit 60, and causes the user to set a value within the range.

When the irradiation diameter and the irradiation intensity are set, the measurement control unit 44 operates the switching unit 152 to dispose the darkening filter 151 on the optical path (ON) (when the user selects the irradiation diameter D or E, the darkening filter 151 is disposed off the optical path (OFF)). The measurement control unit 44 operates the drive mechanism 162 to move the light collection lens 161 to the position Pb at which the sample 11 is irradiated with the laser light having the irradiation diameter B having been input. The measurement control unit 44 further reads, from the storage unit 41, information regarding the relationship between the irradiation intensity of the laser light onto the sample 11 and the rotation angle of the density wheel 141, and rotates the density wheel 141 to a position where the irradiation intensity set by the user is given. It is only required to operate the darkening filter 151, the light collection lens 161, and the density wheel 141 in an appropriate order, or may operate each unit in parallel.

In this example, a case of setting only one irradiation intensity value has been described. However, one intensity value may be set, and a plurality of measurements may be automatically performed while continuously changing the irradiation intensity of the laser light within a predetermined range using the intensity value as an initial value.

Since the darkening filter 151 stepwisely changes the intensity of laser light, if use/non-use of the darkening filter 151 is switched when the intensity of irradiation light is adjusted for the irradiation diameter of certain laser light, the intensity of the laser light is discontinuously changed, and discontinuity occurs in the irradiation intensity of the laser light onto the sample 11.

For the ionization device 1 of the present embodiment, use/non-use of the darkening filter 151 is determined in advance for each candidate value of the irradiation diameter. That is, when the irradiation intensity of laser light is adjusted at each irradiation diameter, use/non-use of the darkening filter 151 is not switched. Therefore, it is possible to expand the adjustable range of the irradiation intensity of laser light without causing discontinuity in the irradiation intensity of the laser light with which the sample 11 is irradiated in any of the plurality of candidate values (A to E) of the irradiation diameter of the laser light. Use of a plurality of density wheels can also adjust the irradiation intensity of laser light without causing discontinuity, but the density wheels are generally expensive. On the other hand, in the present embodiment, since the darkening filter 151, which is less expensive than the density wheel, is used, it is possible to adjust the irradiation intensity of laser light onto the sample 11 less expensively than the configuration using a plurality of density wheels and without causing discontinuity. Since use/non-use of the darkening filter 151 is automatically determined according to the irradiation diameter set in the irradiation diameter setting reception unit 42, convenience in setting of the irradiation diameter and adjustment of the irradiation intensity is improved.

The above-described embodiment is merely an example, and can be appropriately modified in accordance with the spirit of the present invention.

In the above embodiment, as shown in FIG. 2, the intensity range of the laser light covered by changing the darkening rate by the density wheel 141 using the darkening filter 151 and the intensity range of the laser light that can be covered by changing the darkening rate by the density wheel 141 without using the darkening filter 151 are overlapped, but these intensity ranges do not necessarily need to be overlapped.

The above embodiment assumes a configuration in which the intensity of laser light is stepwisely changed by use/non-use of the darkening filter 151, that is, a configuration in which the intensity of laser light is changed in two steps. However, it is also possible to use, as the second intensity changing unit, a unit in which the intensity of laser light can be changed in three or more steps by combining a plurality of darkening filters having different transmittances.

Figure 4:
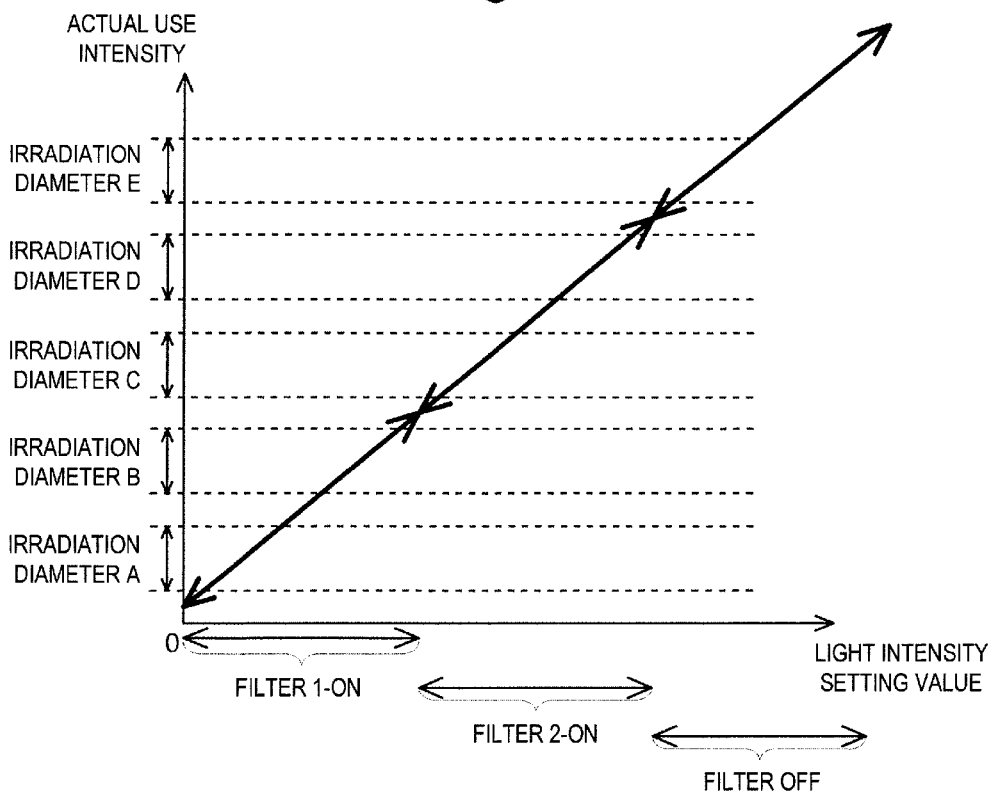
FIG. 4 is a view illustrating the settable range of the irradiation intensity of laser light at the time of use/non-use of the darkening filter and an irradiation intensity range of the laser light actually used in a candidate value of each irradiation diameter in an ionization device of a modification.

FIG. 4 illustrates a modification in which these two points are changed from the above embodiment. In this example, by using the second intensity changing unit 15 including a darkening filter having two types of regions having different transmittances (first filter having high transmittance and second filter having low transmittance), the intensity of laser light is changed in three steps by the second intensity changing unit 15. In this example, the intensity range of the laser light that can be covered by changing the darkening ratio by the density wheel 141 is not overlapped in each of the darkening ratio of the three steps. In this example, the candidate value of the irradiation diameter of laser light is determined in advance such that a switching point (switching to the first filter and the second filter, and switching to use/non-use of the second filter) of the filter in the second intensity changing unit 15 does not fall within the intensity range of the laser light necessary for adjusting the irradiation light intensity at the candidate value of each irradiation diameter. In this example, the values of the irradiation diameters A and B are determined so that the irradiation intensity of laser light can be adjusted within a range that can be changed by the density wheel 141 in a state of using the first filter, the values of the irradiation diameters C and D are determined so that the irradiation light intensity can be adjusted within an intensity range of laser light that can be changed by the density wheel 141 in a state of using the second filter, and the value of the irradiation diameter E is determined so that the irradiation light intensity can be adjusted within an intensity range of laser light that can be changed by the density wheel 141 without using the darkening filter.

Instead of discretely determining a candidate value of the irradiation diameter as in the above embodiment and modification, it is possible to store only the settable range of the irradiation diameter in the storage unit 41, and the user can set an arbitrary irradiation diameter within the range. In that case, the intensity range of laser light covered by changing the darkening rate by the density wheel 141 using the darkening filter 151 and the intensity range of laser light that can be covered only by changing the darkening rate by the density wheel 141 without using the darkening filter 151 are overlapped such that the irradiation intensity of laser light can be adjusted without switching the use/non-use of the darkening filter 151 even when any value within the range is set. A boundary value X of the irradiation diameter, which serves as a reference for switching use/non-use of the darkening filter 151, is determined in advance.

Figure 5:
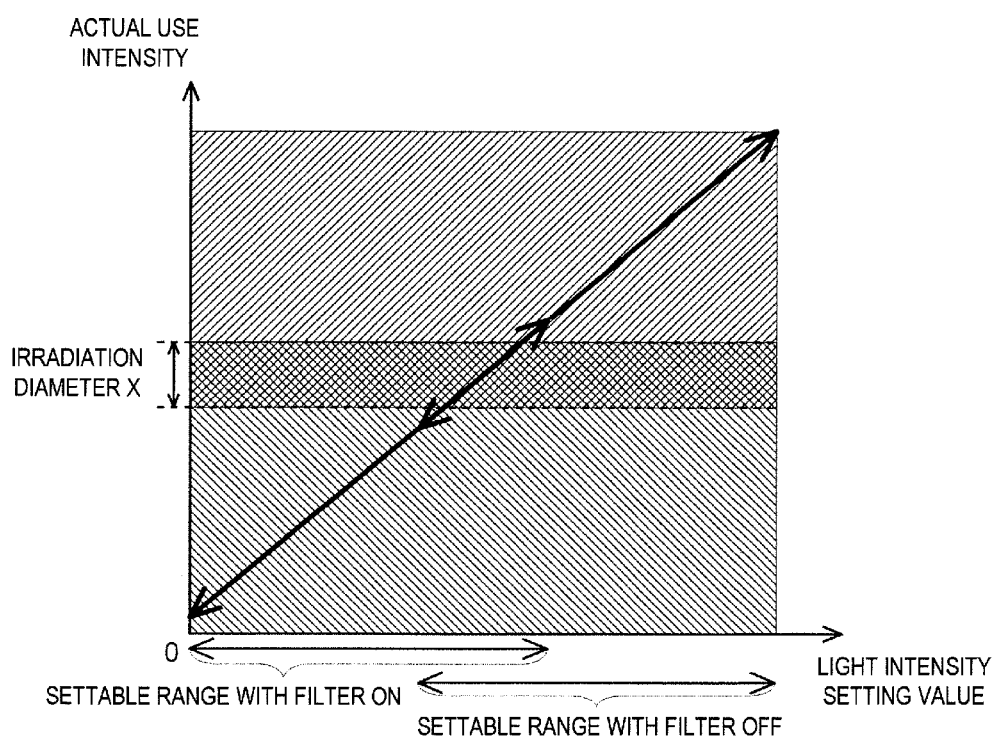
FIG. 5 is a view illustrating the settable range of the irradiation intensity of laser light at the time of use/non-use of the darkening filter and a boundary value of an irradiation diameter in an ionization device of another modification.

Specifically, as shown in FIG. 5, the boundary value X is determined such that the intensity range of the laser light when adjusting the irradiation light intensity at the boundary value X is included in both the intensity range of the laser light covered by rotating the density wheel 141 using the darkening filter 151 and the intensity range of the laser light covered by rotating the density wheel 141 without using the darkening filter 151. In a case where a value of the irradiation diameter equal to or less than the boundary value is input, the intensity of the laser light is continuously changed by the density wheel 141 using the darkening filter 151, and in a case where a value of the irradiation diameter larger than the boundary value is input, the intensity of the laser light is continuously changed by the density wheel 141 without using the darkening filter 151.

Other than that, in the above embodiment, the density wheel 141 is used as a means (corresponding to the first intensity changing unit in the present invention) for continuously switching the intensity of laser light, and the darkening filter 151 is used as a means (corresponding to the second intensity changing unit in the present invention) for stepwisely switching the intensity of laser light. However, it is possible to use another type of optical elements having similar effects.

[Aspects]

Those skilled in the art understand that the plurality of illustrative embodiments described above are specific examples of the aspects below.

(First aspect)

A first aspect of the present invention is an ionization device configured to generate ions by irradiating a sample with laser light, the ionization device including:
- a light source configured to emit laser light;
- a light collection optical system configured to collect laser light emitted from the light source and irradiate a sample with the laser light;
- a first intensity changing unit configured to continuously change an intensity of laser light with which the sample is irradiated;
- a second intensity changing unit configured to stepwisely change an intensity of laser light with which the sample is irradiated;
- an irradiation diameter setting reception unit configured to receive setting of an irradiation diameter of laser light to the sample;
- an irradiation intensity setting reception unit configured to receive setting of an irradiation intensity of laser light to the sample; and
- a laser light intensity controller configured to set an intensity of the laser light with which the sample is irradiated by changing an irradiation diameter of the laser light by means of the light collection optical system and controlling the second intensity changing unit according to the irradiation diameter received by the irradiation diameter setting reception unit, and by controlling the first intensity changing unit according to the irradiation intensity received by the irradiation intensity setting reception unit.

The first intensity changing unit includes, for example, a density wheel. The second intensity changing unit includes, for example, a darkening filter and a switching unit configured to switch use/non-use of the darkening filter. The first intensity changing unit and the second intensity changing unit may be disposed on an optical path between the light source and the light collection optical system, or may be disposed on an optical path between the light collection optical system and the sample.

The ionization device of the first aspect includes a light collection optical system configured to collect laser light, a first intensity changing unit configured to continuously change the intensity of laser light, and a second intensity changing unit configured to stepwisely change the intensity of laser light. Combining these, it is possible to change the intensity of laser light in a range wider than the range of the intensity of the laser light changeable by the first intensity changing unit. However, since the second intensity changing unit stepwisely changes the intensity of laser light, when the second intensity changing unit is operated during adjustment of the irradiation intensity of laser light for a certain irradiation diameter, the irradiation intensity of the laser light discontinuously changes. Therefore, in the ionization device according to the present invention, the second intensity changing unit changes the intensity of the laser light with which the sample is irradiated according to the irradiation diameter set in the irradiation diameter setting reception unit, and changes the intensity of the laser light with which the sample is irradiated according to the irradiation intensity set in the irradiation intensity setting reception unit. This can continuously change the intensity of laser light in a range exceeding the setting range of the first intensity changing unit. The second intensity changing unit only needs to stepwisely change the intensity of laser light, and only needs to use a darkening filter or the like having a simple configuration. Therefore, it is possible to configure the second intensity changing unit at a lower cost than the configuration including a plurality of attenuators configured to continuously change the intensity of laser light. Since the intensity of the laser light with which the second intensity changing unit irradiates the sample is automatically changed according to the irradiation diameter set in the irradiation diameter setting reception unit, convenience of the work is improved.

(Second Aspect)

An ionization device according to a second aspect of the present invention is the ionization device according to the first aspect, further including
a storage unit configured to store information on a plurality of candidate values of the irradiation diameter, in which
the irradiation diameter input reception unit is configured to receive input for selecting any of the plurality of candidate values stored in the storage unit.

In the ionization device of the second aspect, the user can easily set the irradiation diameter by selecting a desired candidate value from among candidate values prepared in advance.

(Third Aspect)

The ionization device according to the third aspect of the present invention is the ionization device according to the first aspect or the second aspect, in which
the second intensity changing unit includes a darkening filter and a switching unit configured to switch use/non-use of the darkening filter.

An ionization device of a third aspect can be configured at low cost because of use of a darkening filter.

(Fourth Aspect)

An ionization device according to a fourth aspect of the present invention is the ionization device according to any of the first to third aspects, in which
an intensity range of laser light that can be changed by the first intensity changing unit in a state where an intensity of laser light is changed to one step by the second intensity changing unit and an intensity range of laser light that can be changed by the first intensity changing unit in a state where an intensity of laser light is changed to another one step by the second intensity changing unit partially overlap.

An ionization device of a fourth aspect can more reliably prevent discontinuity from occurring in an intensity of laser light at adjusting fluence of laser light by overlapping intensity ranges of laser light as described above. It is also possible to configure this ionization device such that a user can set any value of an irradiation diameter within a predetermined range.

(Fifth Aspect)

An ionization device according to a fifth aspect of the present invention is an ionization device according to any of the first to fourth aspects, in which
the sample is ionized by an LDI method or a MALDI method.

The ionization device of the fifth aspect can be preferably used as an ionization device when acquiring data on distribution of a specific substance on a surface in a living tissue, for example.

REFERENCE SIGNS LIST

1 . . . Ionization Device
10 . . . Body Portion
11 . . . Sample
12 . . . Sample Stage
121 . . . Drive Mechanism
13 . . . Laser Light Source
14 . . . First Intensity Changing Unit
141 . . . Density Wheel
142 . . . Rotation Mechanism
15 . . . Second Intensity Changing Unit
151 . . . Darkening Filter
152 . . . Switching Unit
16 . . . Light Collection Unit
161 . . . Light Collection Lens
162 . . . Drive Mechanism
40 . . . Control/Processing Unit
41 . . . Storage Unit
42 . . . Irradiation Diameter Setting Reception Unit
43 . . . Irradiation Intensity Setting Reception Unit
44 . . . Measurement Control Unit
50 . . . Input Unit
60 . . . Display Unit

The invention claimed is:

1. An ionization device configured to generate ions by irradiating a sample with laser light, the ionization device comprising:
   a light source configured to emit laser light;
   a light collection optical system configured to collect laser light emitted from the light source and irradiate a sample with the laser light;
   a first intensity changing unit including an attenuator configured to continuously change an intensity of laser light with which the sample is irradiated;
   a second intensity changing unit including a darkening filter configured to stepwise change an intensity of laser light with which the sample is irradiated;
   a storage unit configured to store a relationship between a irradiation diameter of the laser light, a level of changing the intensity of the laser light of the darkening filter, and the intensity of the laser light irradiated with the sample; and
   at least one processor configured to
   receive input of an irradiation diameter of laser light to the sample;
   receive input of an irradiation intensity of laser light to the sample; and
   change an irradiation diameter of the laser light by means of the light collection optical system;
   control the second intensity changing unit according to the irradiation diameter received based on the relationship; and
   set an intensity of the laser light with which the sample is irradiated by controlling the first intensity changing unit according to the irradiation intensity based on the relationship.

2. The ionization device according to claim 1, wherein the storage unit is further configured to store information on a plurality of candidate values of the irradiation diameter, and
the at least one processor is configured to receive input for selecting any of the plurality of candidate values stored in the storage unit.

3. The ionization device according to claim 1, wherein at least one processor is configured to change the intensity of the laser light with which the sample is irradiated by switching the darkening filter from a use state to a non-use state.

4. The ionization device according to claim 1, wherein an intensity range of laser light that can be changed by the first intensity changing unit in a state where an intensity of laser light is changed to one step by the second intensity changing unit and an intensity range of laser light that can be changed by the first intensity changing unit in a state where an intensity of laser light is changed to another one step by the second intensity changing unit partially overlap.

5. The ionization device according to claim 1, wherein the sample is ionized by an LDI method or a MALDI method.

* * * * *